May 11, 1965 L. G. BERQUIST 3,183,135
METHOD FOR THE MANUFACTURE OF TIRES
Filed Nov. 19, 1962 4 Sheets-Sheet 1

INVENTOR.
LEONARD G. BERQUIST
BY
ATTORNEYS

May 11, 1965   L. G. BERQUIST   3,183,135
METHOD FOR THE MANUFACTURE OF TIRES
Filed Nov. 19, 1962   4 Sheets-Sheet 2

INVENTOR.
LEONARD G. BERQUIST
BY
ATTORNEYS

May 11, 1965 L. G. BERQUIST 3,183,135
METHOD FOR THE MANUFACTURE OF TIRES
Filed Nov. 19, 1962 4 Sheets-Sheet 3

INVENTOR.
LEONARD G. BERQUIST
BY
ATTORNEYS

May 11, 1965  L. G. BERQUIST  3,183,135
METHOD FOR THE MANUFACTURE OF TIRES
Filed Nov. 19, 1962  4 Sheets-Sheet 4

INVENTOR.
LEONARD G. BERQUIST
BY
ATTORNEYS 3,183,135
METHOD FOR THE MANUFACTURE OF TIRES
Leonard G. Berquist, Niles, Mich., assignor to National-Standard Company, Niles, Mich., a corporation of Michigan
Filed Nov. 19, 1962, Ser. No. 239,106
3 Claims. (Cl. 156—126)

This application is a continuation-in-part of patent application Serial No. 604,880, filed August 20, 1956, now abandoned.

The present invention relates to a new and improved method of manufacturing tires, and while the invention is primarily intended for the manufacture of tires having plies made of a wire fabric, the broad principles of the invention may be adapted to the manufacture of tires from nylon, rayon, cotton or other textile materials.

The invention relates to novel methods of making plies which are used in the manufacture of pneumatic tires. These plies may be used as breaker strips, or as reinforcements for the tire body or they may be used as body plies extending from bead to bead of the tire.

One of the principal advantages and objects of the invention is to avoid the objectionable splicing which is employed in all present methods of tire building. In the prevailing method of building tires, the cord or wire fabric which constitutes a ply of the tire is provided with a self-adhesive insulating coating or rubberized and then cut on the bias at the angles which are determined by the tire designer and such as will give the crown angle which is deemed to be most advantageous. The strips of bias cut fabric are assembled or butt-spliced end to end to form long lengths of bias cut rubberized fabric and these are assembled on rolls and furnished to the tire builder, who wraps the plies about the tire building drum in the building operation, cutting each ply so it will overlap slightly to form the splice on the building drum. Sometimes two plies at opposite inclined angles are assembled together and spliced after each wrapping or winding operation.

It is also the custom to work in short pieces of fabric in a single ply so that it is not infrequent to find several splices in a single ply of fabric.

These butt and lap splices are objectionable because they create an unbalanced condition in the tire. They are time consuming and quite often the builder will be careless about making the splice or rolling the ends of the fabric pieces together.

It has been recognized for a long time that there are serious objections to the splicing of bias cut fabric, both in butt splicing the bias cut strips into the lengths which go to the tire builder and in lap splicing the ends of the plies on the building drum; but, up to the present, no adequate practical remedy or substitute has been developed.

It is the purpose of the present invention to make and prepare building fabric in such a manner that splicing is completely avoided and the plies, whether breaker plies or body plies or reinforcing plies, may be used in regular building methods without any splicing whatever.

In the presentation of the invention the description will relate to the manufacture of tires in which wire fabric is used, and in which strands having a uniform circumferentially spaced relation run on the bias as in standard tire constructions. That is, the strands extend generally lengthwise of the axis of rotation of the cured tire, two or more sets of strands having a crossing relation, if desired. It will be understood that where the word "strands" is used, this is intended to include metallic strands, or strands of any of the various textile materials, such as rayon, nylon or cotton.

According to the invention, the strands or cords may run radially or substantially radially of the carcass, which means that they are parallel or substantially parallel to the axis of rotation of the tire, or, the strands or cords may be spirally or helically oriented to the tire axis of rotation, with a helix or bias angle of, for example, 45° or less with reference to the tire axis of rotation.

Recent developments in the art of tire design have shown that various specific and critical orientations of the carcass plies will provide greatly improved performance characteristics in cured tires. The flexibility in ply orientation permitted by the concepts of the present invention is considered as providing the tire designer with greater opportunities to secure optimum performance characteristics than heretofore possible using known techniques.

In the drawings, the several steps in the building of tires by the improved method are shown in more or less diagrammatic form, and the description is quite detailed. It will be understood that adherence to the detailed disclosure of this application is not essential to a realization of the benefits of this invention and that changes, modifications and improvements may be made therein without departing from the basic principles of the invention.

Figure 9:
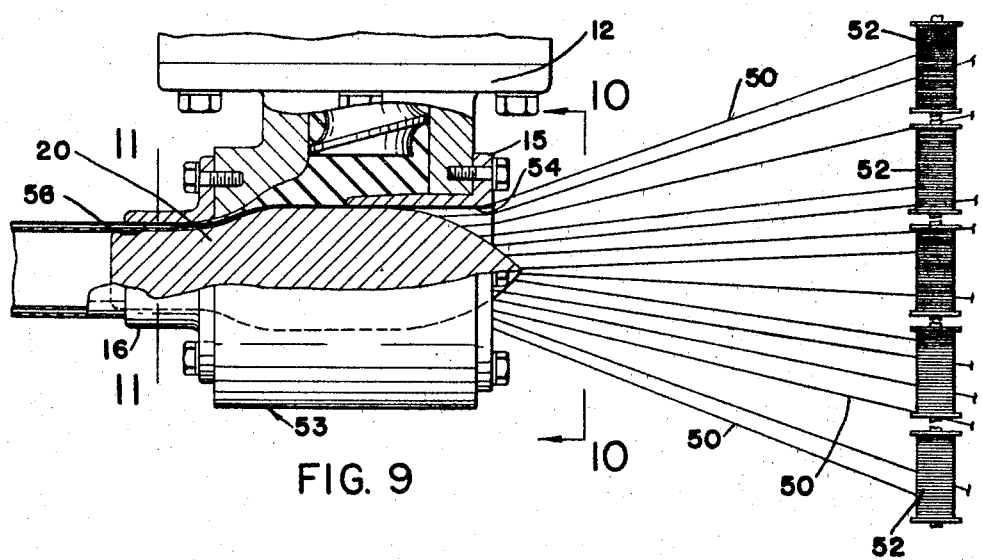
FIG. 9 is a view showing the manner in which certain principles of the invention may be used in the preparation of building fabric with radial strands.
Figure 10:
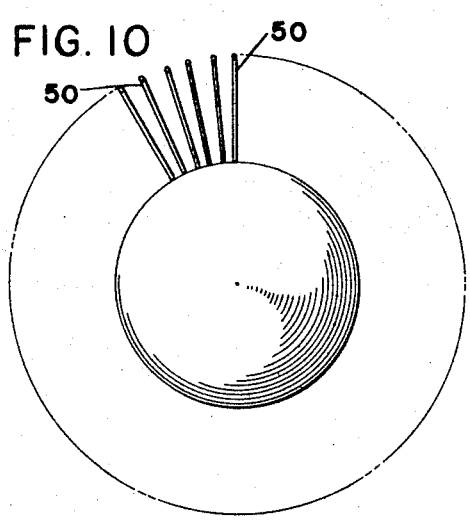
Figure 11:
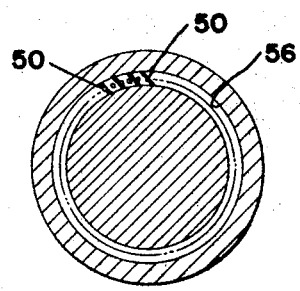

FIGS. 10 and 11 are cross sections on the lines 10—10 and 11—11, respectively, of FIG. 9.

Figure 12:
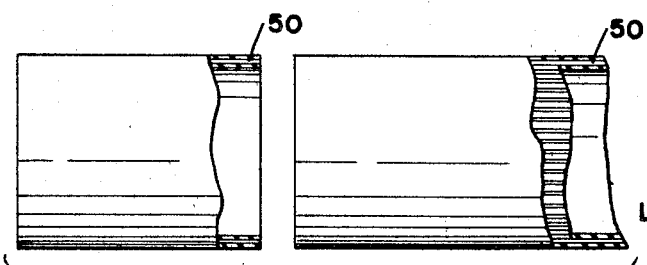

FIG. 12 is a view of the product of FIG. 9 and the way in which that product may be subdivided into individual building plies.

Figure 2:
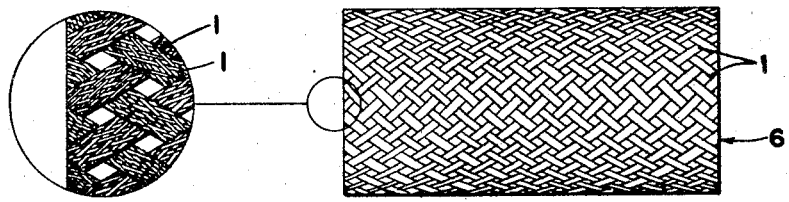
FIG. 2 is a view showing a short section of a tube, such as would be the product of the machine shown in FIG. 1. In this view the strands are composed of flat braided tape.

Referring particularly to that form of the invention in which the strands are made of wire, it will be understood that the strands may be a single wire, usually of steel, which may be brass-plated or otherwise treated with one of the well-known commercial bonding materials, so that the insulating coating or rubber which is applied thereto will form a vulcanized bond with the wire. In lieu of single wires, each strand may be a cable or bundle of very fine wires likewise treated for rubber adhesion. In some cases several wires or cables may be assembled into tape form, either as parallel wires or wires braided into the form as shown in FIG. 2. For many tire constructions it is preferred to use a cable of very finely drawn steel wires, which have great flexibility and have proven to be practical for the manufacture of wire tires.

In adapting the invention to any of the textile materials, like variations may be employed.

Figure 3:
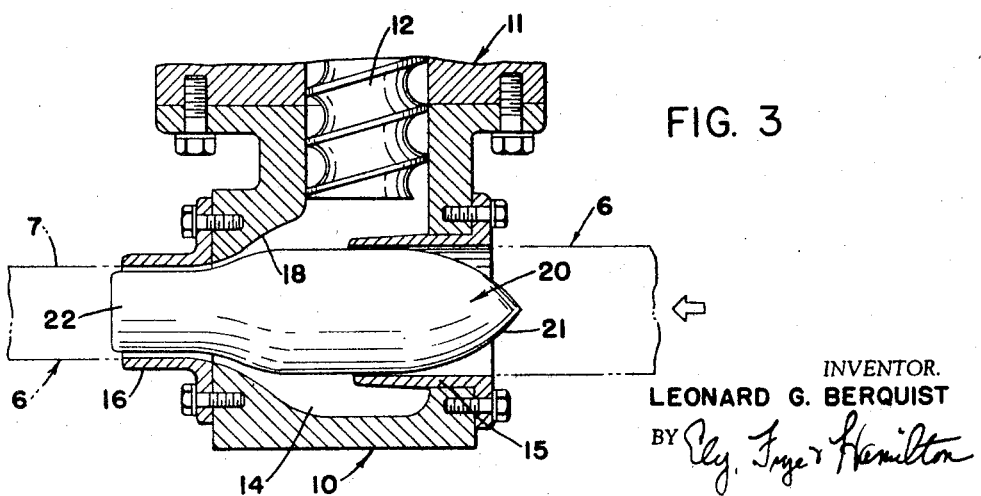
FIG. 3 is a cross section through the head of an extruding die which can be employed to force rubber or rubber-like material into the tube and around the several strands thereof.

The strands or elements are indicated by the numeral 1. They are carried each on a spool 2. The several spools, which may be 96 or more in a single machine, are mounted on involute trackways in a circular table 4 and are propelled about the table so that they pass in and out, the several strands which meet at a mandrel 5 are passed under or over other strands and thereby are braided to form a long cylinder 6, a fragment of which is shown in FIG. 3.

Figure 1:
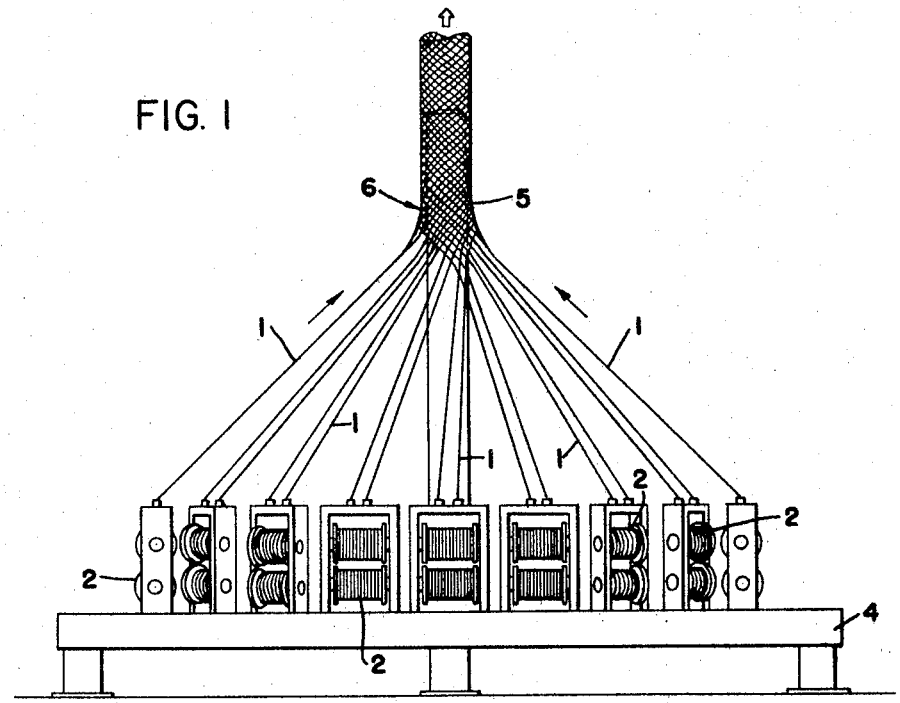
FIG. 1 is a schematic view showing a circular braider of a well-known type on which may be made a braided tube-like structure suitable for the purposes of the invention. In the use of such a braider the strands or elements will be laid at an angle and will be interwoven in braided form.

The braided tube is drawn upwardly in the direction of the arrows in FIG. 1 by a draw table or carriage, which is propelled outwardly as the braid is produced and the only limitation on the length of the tubular structure is the possible length of travel of the draw table. The speed of the withdrawal by the carriage relative to the speed of the braiding operation determines the angular position of the strands. By varying the speed of the draw table it is easy to attain any angle which the several strands make with a plane passing transversely of the tube and thus to determine and fix, at will, the angular position, or crown angle, which the strands will assume when they are made into the tire.

The next step in the preferred form of the process is the coating or rubberizing of the tubular structure, which is necessary in order to adapt the structure to the further steps in the tire building operation. It is necessary to thoroughly coat and impregnate the structure with rubber, which should encase and insulate each strand from the others in order to reduce to the minimum the friction generated during the operation of the tire. There may be a number of methods and machines for impregnating the tubular structure and it is not intended, in this application, to restrict this step to the apparatus shown or to the time when the rubberizing should occur. However, there has been devised a simple and effective tubing machine head which will perform the operation and which is shown in cross section in FIG. 3. It will be understood that no claims are made herein for the inventive subject matter disclosed in FIG. 3, or in the description thereof, nor in so much thereof as is used in FIG. 9. That invention is covered in applicant's Patent No. 2,874,411, granted February 24, 1959.

The coating apparatus may be located between the braiding unit and the draw table therefor so that the tubular structure may be rubberized directly after it is made, or the coating operation may be done at a later time.

Referring to FIG. 3, there is shown a type of rubberizing unit which may be used to coat and insulate the tube. In this view the non-rubberized or raw braided tubular structure 6 is shown as entering from the right, an extruding die head indicated as a whole by the numeral 10 and leaving at the left as a fully coated tubular unit having rubber forced into and around each strand of the tube and covering both the inner and outer surfaces, as indicated at 7. If the insulation with rubber is to be done after the tube is delivered by the braiding unit, the tubular structure may be propelled solely by the movement of the rubber through the die or the travel may be assisted by a drawing table or the like.

The die head is attached to the outlet end of a tubing machine of any standard construction indicated at 11 in which there is a screw 12, which forces into the die head under considerable pressure, a mass of rubber or rubber-like material which is to compose the body stock or coating of the tire plies.

The die head is formed with a chamber 14 and at the right hand side of the chamber is the annular sleeve 15 which extends into the chamber and serves as the guide for the incoming tube. On the opposite side of the chamber is the annular die 16 through which the coated and impregnated tube issues. It will be noted that the wall of the chamber converges, as at 18, to the aperture where the die is located, and it will also be noted that the die is somewhat less in circumference than the tubular structure when it entered the head. This will not only force the rubber into and around the strands of the tube, but it will compact the tubular structure and will also cause the strands thereof to assume a longer angle. This latter is a factor which must be taken into consideration in planning the angular position of the strands at the braiding machine.

In order to support the tube against the heavy pressure of the rubber and also to form a backing so that the rubber will be forced into and throughout the structure of the tube, there is what may be called a floating mandrel or inside annular die which is given the reference numeral 20. This mandrel is an elongated body with a shape something like a cartridge. It is inserted in the tubular structure and is carried along by the progression thereof until it is arrested and held by the outlet die 16. The trailing end 21 of the mandrel fits in the inlet sleeve with just enough clearance to permit the passage of the tube. Toward the leading end, the mandrel is tapered to a long snout 22 which fits within the outlet die 16 with sufficient clearance to allow the egress of the tube with the desired thickness of rubber 7 on its inner and outer surfaces.

It will be found that the mandrel 20 will center itself with its forward end in the outlet die 16 and its trailing end held in the inlet die 15, and that by accurately dimensioning the snout 22, an even and fixed amount of rubber will be formed on both surfaces and that the rubber will have penetrated into the interstices of the tube and insulated each strand from the others.

Figure 4:
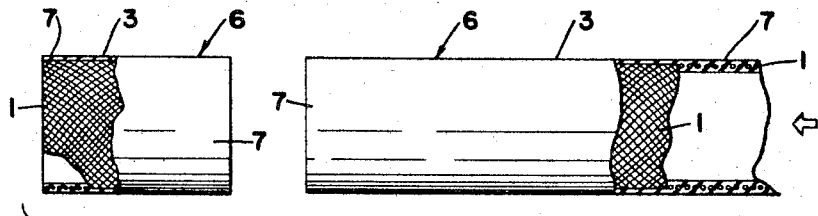
FIG. 4 is a view of a length of the braided tubular product made by the apparatus of FIG. 3, showing the manner in which the tube may be cut or severed into sections or widths to form a tire building ply.

A coated tubular structure is shown in FIG. 4 and as disclosed therein such a tube may be cut into endless unspliced ply bands of any desired length for the tire building operation.

Figure 6:
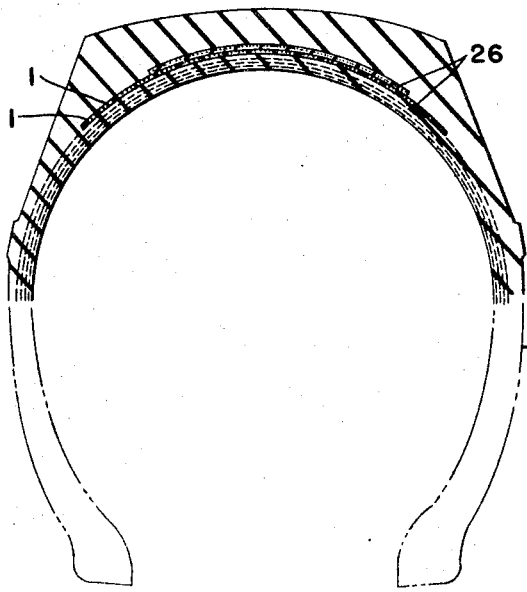
FIG. 6 is a cross section of a standard pneumatic tire showing the improved building material used as a breaker strip only.
Figure 7:
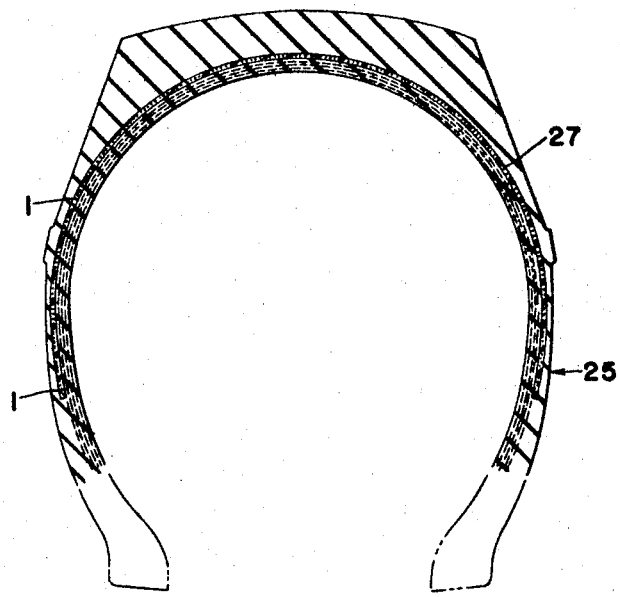
FIG. 7 shows a similar view with the tire building material used as a reinforcing ply.

The prepared ply band is then ready to be incorporated in an uncured tire band or "green tire carcass." It may be a relatively narrow ply band such as is used as a breaker strip or breaker strips as shown in FIG. 6, in which a standard tire is indicated at 25 and two breaker strips at 26. The prepared ply band may be used as a reinforcing insert ply built into the carcass of the tire as shown in FIG. 7, where such a reinforcing strip is shown at 27. Or the band may be used for body plies as in the building of a tire 28 for automobile or heavy bus or truck service. In this case two bands are shown at 30 and 31, the former constituting the under-bead ply and the latter the over-bead ply, the edges of the plies being brought around so as to enclose the bead cores 34.

In the technique of building an uncured tire carcass, the usual drum building practices are followed, it being necessary to note only that in applying the band or bands on the building drum, they may be applied by expanding the rubberized bands and telescoping them over the drum or they may be "spun on" in accordance with the practice often used in applying the first or band ply to a tire building drum or core. Apparatus for expanding a band, telescoping it over a form and then releasing the band so that it will contract over the building form is well known, as shown, for example, in Patent No. 2,517,889, granted August 8, 1950.

Figure 5:
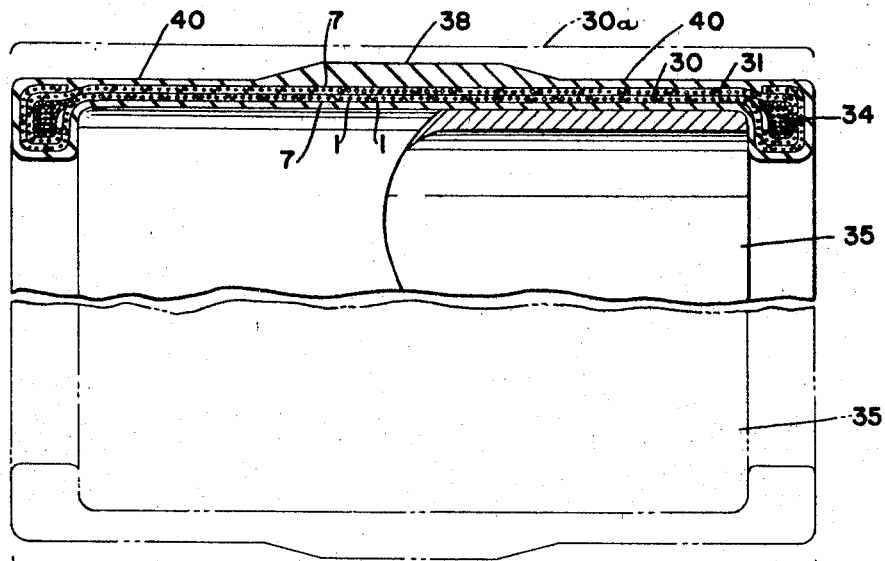
FIG. 5 is an illustrative drawing showing the manner in which a ply of material such as produced by the steps shown in the previous figures is used in the making of an uncured tire carcass by the standard drum building method.
Figure 8:
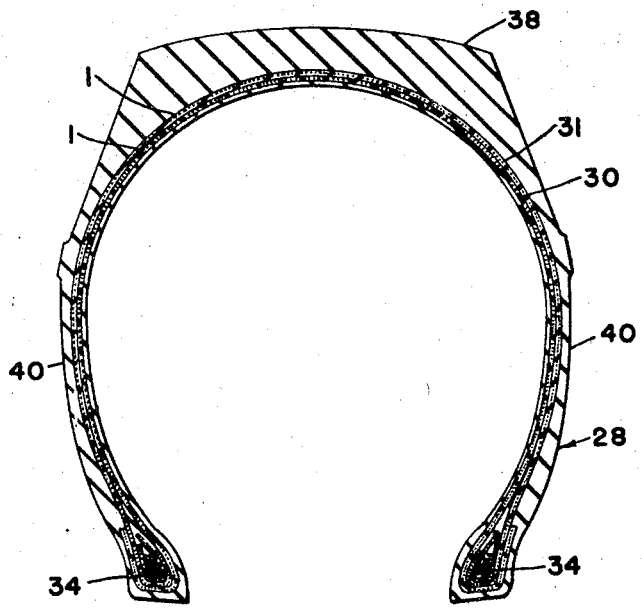
FIG. 8 shows a tire with the material used as body plies.

In FIG. 5 in which the process of building the tire of FIG. 8 is shown, as an example, a standard tire building drum is shown at 35, the two plies 30 and 31 have been laid over the drum and wrapped about the bead cores 34 to form a conventional "tie in" about the beads. The dotted lines 30a indicate how a ply may be expanded and then telescoped over its drum to be released so that it will fit over the drum.

The tread 38 and sidewalls 40 are applied and such other finishing operations as may be required are now done and the uncured tire band, whether the fabric of this invention is used in any of the several positions alone or in combination, is taken from the drum, expanded to tire shape and vulcanized. The diagonally positioned strands permits sufficient expansion so that the tire will form properly and the molds will fill out when the curing pressure is applied.

Referring to the modification of the invention shown in FIGS. 9 to 12 inclusive, the essential difference is that instead of a braided tubular structure forming the material from which the tire plies are made, the tubular structure is composed of parallel wires, cords or strands, which as in the previously described form may be individual wires, or cables or textile cords or tapes or braids, made of wires, cables or textile cords. Likewise here, when the term "strand" is used it will be understood to apply to all such materials. Plies made of radial or meridian cords may be built into an uncured tire carcass in the same manner as now generally practiced. The rubber which bonds the several strands together will also afford sufficient expansion both in the tire building, and shaping and curing operations.

Referring to the views which illustrate this modification, the several strands 50 are assembled on spools 52 and are led into a die head 53 and over a mandrel 20 similar to that shown in FIG. 3. As the strands converge they enter an annular aperture 54 in the die head and pass out through a reduced annular aperture 56 at the other side of the die head. The rubber stock is forced into and around the wires so that they issue as a complete tubular structure shown in FIG. 12, which may be sub-divided into building bands in like manner. If it is desired to produce a tubular structure composed of uniformly spaced apart and spirally or helically oriented strands, this may be accomplished as for example, by providing a die head 11 which rotates at a predetermined speed or a rotating rack for spools 52. Thus, a tubular structure is produced which may be severed into endless, unspliced ply bands having radially disposed, spirally oriented strands with a helix or bias angle of preferably less than 45° with respect to the axis of the band and tire carcass. As noted above either of these forms of bands may be used in the construction of tires in which radially or meridianally arranged cords or strands are required in the body or other plies of the tire casing.

The invention shown and described herein has a very substantial utility in the field of tire manufacture and it will be understood that it may be employed with any well-known tire building technique or machinery. Where the terms "rubber" or "rubber-like" are used in the specification or claims, it will be understood to cover any of the compounds used in tire building. Where the term "strand" is used in the specification or claims, it is intended to have a broad connotation and covers wires, cables, braids, tapes, textile strands used in tire manufacture or tapes or braids or cables made therefrom. While it is preferred that the rubberizing of the fabric should be performed before cutting the tubular fabric in lengths for the tire building operation, it is possible to rubberize the braids just before or at the time of the tire building operation. It also will be noted, from the drawings and description of the rubberized tubular bands, that, regardless of the use made of such bands in the building of tires, no splice of any kind is found in the bands; and they are readily telescoped over the tire building drum into proper position.

What is claimed is:

1. The method of manufacturing a tire comprising the steps of, braiding a plurality of strands to form a continuous cylinder having a uniform cross section, applying an insulating coating to the strands of said cylinder, severing said coated cylinder into predetermined widths, incorporating at least one of said severed cylinder widths without substantial change of said uniform cross section as a part of an uncured tire with the axis thereof coinciding with the axis of rotation of the tire, and thereafter shaping and vulcanizing the uncured tire.

2. The method of manufacturing a tire comprising the steps of, forming a hollow circumferentially endless cylinder by extruding parallel strands substantially longitudinally of a rotating mandrel while simultaneously coating and completely bridging said strands with self-adhesive insulating coating so that said cylinder has a substantially uniform cross section throughout its length of circumferentially spaced strands embedded in said coating with said strands extending in a direction generally lengthwise of the axis of said cylinder, including the step of telescoping said cylinder coaxially with the axis of a tire building drum without substantial change of said uniform cross section as a part of an uncured tire with the axis thereof coinciding with the axis of the tire, and thereafter shaping and vulcanizing the uncured tire.

3. The method of manufacturing a tire, according to claim 2, wherein said continuous cylinder is formed with said strands helically oriented with respect to the axis of said cylinder and said cylinder is telescoped over said building drum so that said strands are meridianally biased with respect to said axis of rotation of the tire at a helix angle of less than 45°.

References Cited by the Examiner

UNITED STATES PATENTS

| 2,451,973 | 10/48 | Purdy | 156—126 |
| 2,501,644 | 3/50 | Kraft et al. | 156—126 X |
| 2,517,889 | 8/50 | Kuffler | 156—394 X |
| 2,588,207 | 3/52 | Cleland et al. | 156—126 |
| 2,692,005 | 10/54 | De Cloud | 156—136 X |

EARL M. BERGERT, *Primary Examiner.*